July 20, 1948.  W. E. KETLAND  2,445,620
FISH PICKER
Filed March 15, 1945
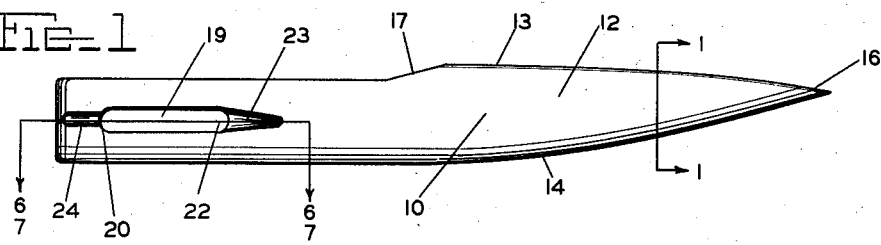
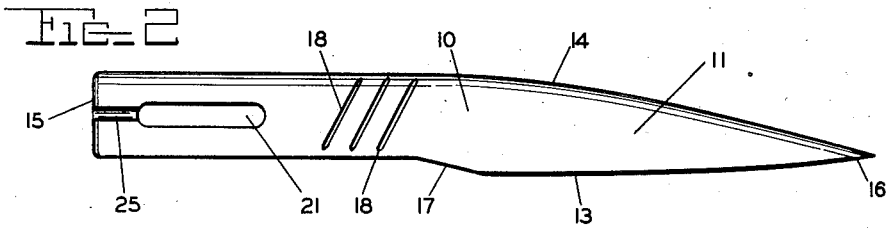
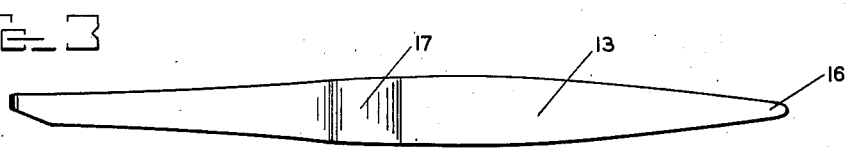
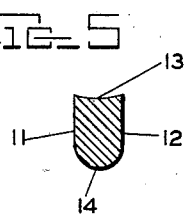
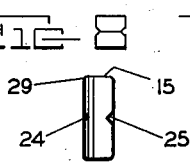
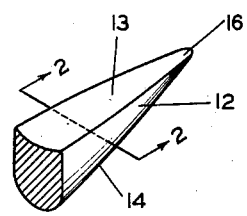
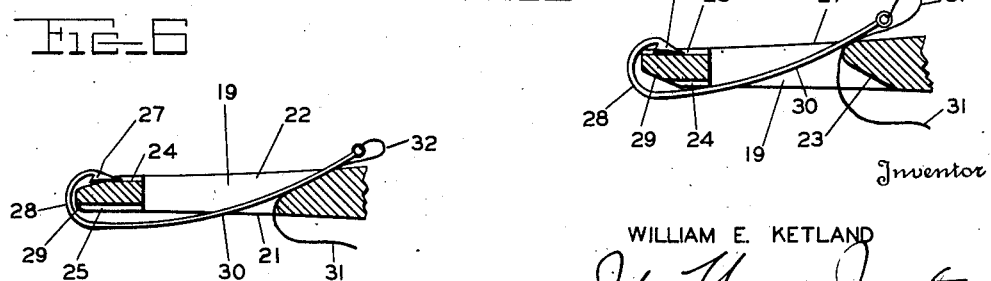
Inventor
WILLIAM E. KETLAND
By John Howard Joynt
His Attorney Patented July 20, 1948

2,445,620

UNITED STATES PATENT OFFICE 2,445,620

FISH PICKER

William E. Ketland, Alexandria, Va.

Application March 15, 1945, Serial No. 582,875

7 Claims. (Cl. 43—29)

My invention relates to a hand tool particularly adapted for the ready and rapid removal of fish from nets and the like without injury or damage to either. As well, it relates to the provision of a picker for the ready and rapid removal of fish hooks from the mouth or throat of fish, without injury to or mutilation of the fish, and without damage to the fish hook.

An important object of my invention, therefore, is to provide a simple and rugged, inexpensive instrument which can be readily and easily manipulated by the most inexperienced user with satisfactory results, either for the removal of fish caught in nets without damage to the net or injury to the fish, or for the removal of hooks from the mouth and throat of fish, in the substantial absence of either damage to the hook or injury or mutilation to the fish or injury to the hand of the user.

Another object is to produce an instrument of the general type described which can be readily die-pressed or otherwise produced by simple manufacturing technique, which is light-weight, corrosion-resistant, and of long life; which fits readily into the hands of the user, and which can be employed by him after a minimum of preliminary instruction.

Other objects in part will be obvious and in part pointed out hereinafter during the course of the following description, taken in the light of the accompanying drawings.

My invention accordingly resides in the several arrangements and combinations of features, and in the several operational steps, as well as in the relation of each of the same with one or more of the others, the scope of the application of all of which is more fully set forth in the claims at the end of this specification.

In the accompanying drawings, wherein I have disclosed, solely by way of illustration, one embodiment of my invention which I prefer at present:

Figure 1 is a longitudinal side elevation, bottom side uppermost, and illustrating what constitutes the left side of the tool, when viewed from the rear;

Figure 2 is a side elevation of my tool, rotated through 180° from the position shown in Figure 1;

Figure 3 is a bottom plan view of my new instrument;

Figure 4 constitutes a fragmentary perspective view through the front part of my new instrument or tool, and taken on line 1—1 of Figure 1;

Figure 5 constitutes a transverse section taken on line 2—2 of Figure 4;

Figures 6 and 7 are sections taken through lines 6—6 and 7—7 of Figure 1, and illustrating the manner in which the instrument is used for the removal of fish hooks when the hooks are caught in the mouth and throat, respectively, of the fish; while, Figure 8 constitutes a rear end elevation, showing the grooves for the reception of the bale of the hook.

Throughout the several views of the drawings, like reference numerals indicate like parts.

As conducive to a more thorough understanding of my invention, it may be noted that heretofore considerable difficulty has attended upon removing fish which are entrapped, usually in the region of their heads, in the meshes of fish nets and the like. Mutilation of the fish has often attended attempts to remove them from their enmeshment, particularly when they are trapped due to the strands of the net catching in the gills or flukes of the fish. Additionally, such attempts at removal have frequently been accompanied by damage to the mesh of the net itself. This increases the attention and supervision which is required, including repair of the net and the like. When such damage is left unrepaired, holes develop and the fish and other catch have provided for them means of escape from the net.

While much effort has been directed to providing for the easy removal of entrapped fish from the captivating mesh of the nets, no entirely satisfactory instrumentality has heretofore been advanced for accomplishing this end. It was not, then, until my present tool, which I term a "picker," was made available that ready and successful removal of net-entrapped fish has been made possible.

Moreover, difficulty of substantial order has been encountered in the removal of the barbs of fish hooks from the mouths and throats of the fish. The reversed barb provided at the tip of the hook to anchor the same and to prevent the hook from slipping from its region of entrenchment or embarbment during the play of the fish, necessarily interposes the same difficulty in removal once the fish has been caught. Particularly while the fish is alive and is struggling while the operator is manipulating the hook the likelihood is encountered, not only of mutilation and injury to the fish itself, but as well, of injury to the operator, either from the fish or the hook or both, and of damages to the hook itself.

Much effort has been directed to providing a means for supporting the hook and masking the barb during the process of removal of the hook from the interior of the fish. For one reason or another, however, none of these proposed suggestions have proven overly effective. In particular, few of them interpose any effective support for either the yoke or shank portion of the hook. None of them interposes such support while masking the barb during the manipulatory steps.

An important object of my invention, therefore, is to provide a fish tool or picker which, while in substantial measure avoiding the aforementioned disadvantages of the prior art, at the same time makes it possible, as an entirely new advance in the art, to remove effectively fish which are entrapped in a fish net without injury to the fish or damage to the net; and as well, to remove effectively and quickly, hooks imbedded either in the mouth or throat of a fish, without injury to the fish or operator, and without damage to the hook.

Referring now more particularly to the embodiment of my invention as illustrated in the several views of the drawings, the new picker consists essentially of an elongated body or shaft portion indicated generally at 10 in Figures 1 and 2. As will be observed more particularly from the drawings the tool, when viewed from the top rear, comprises right and left side portions 11 and 12, respectively, a stepped yet comparatively straight bottom surface 13, and a rounded top surface, indicated generally at 14. The end surface 15 thereof extends substantially at right angles to the top and bottom 14 and 13, while the front end terminates in a blunted point 16. This blunted point 16 is formed by the juncture of the comparatively straight bottom face 13 with the forwardly and downwardly sloping rounded top surface 14 and the inwardly and forwardly curving side walls 11 and 12.

For convenience in handling, the bottom surface 13 is stepped as illustrated at 17 (Figures 1, 2, and 3) and is provided with notched grooves or the like 18 midway and transversely of its extent (Figure 2) to permit ready adaptation to the hands of the operator, with desired non-slip characteristics.

The front end, constituting the subject matter already developed, is adapted for the removal of fish from entrapment, as by the gills, flukes, or the like, in the meshes of a fish net, seine, or similar entrapping device. It will be readily understood of course, that the fish, becoming ensnared in the net, at first struggles vigorously to escape. Frequently in these attempts its head will extend partly through the meshes of the net, so that these flexible meshes will slip back of the gills, and will catch therein. The fish is effectively caught, as though in a trap, and cannot escape by itself. Neither can the fisherman readily remove the entrapped fish, without likelihood of injury either to the fish or himself, or damage to the net. It is extremely difficult to pick the mesh out of its entrenchment back of the gills of the fish without damage of some sort resulting from such procedure.

By the use of my new picker, however, all of these difficulties are effectively relieved. The tool is simply slipped down, with its pointed end 16 foremost, and its upper surface 14 topmost, across the bridge of the fish's head, between it and the mesh of the net. To facilitate ready adaptation of the surface 13 to the back of the fish's head, the under surface 13 of the tool is provided with a shallow longitudinal recess, the contour of which is readily evident from a consideration of Figure 5. In this manner, the tool is readily adapted to the shape of the fish. When applied between the fish and the mesh of the net, then by a slight prizing motion the net can be slid from the surface of the fish. It will be readily understood that once the net is gently prized away from the fish, the net can be readily pulled away from the fish, and the latter removed from its position of entrenchment. To the end of best accomplishing both the objectives recited in the foregoing and those pointed out hereinafter, my new instrument is constructed substantially entirely of rounded, smooth, and substantially unbroken surfaces, with continuous as distinguished from discontinuous surfaces.

My new tool can be formed of any suitable material such as light-weight alloy metals, corrosion-resistant material, wood, or similar materials. Because of the comparatively heavy weight of even the lighter alloy metals, however, and because of the cost thereof and tendency to rust after continued service and exposure to the elements, I prefer to employ materials other than metals. Moreover, wood is found to deteriorate after continued service, to check and disintegrate. After prolonged use, I find that it roughens and damages the net. When wet the wood has a tendency to let the net catch. This wears and cuts the point, so that subsequent use of the tool is slowed. My research has led me to the conclusion that all in all, the field of plastics comprises the most satisfactory substances for the construction of my new picker, and I have observed that any solid molded plastic construction gives rise to satisfactory results, with sturdiness displayed throughout long periods of service.

My new tool is also particularly adapted, as has been recited at some length heretofore, for the safe removal of hooks from the interior of fish, without danger of injury either to the fish or operator, and without damage to the fish hook. The rear portion of my new tool is particularly adapted for this purpose.

Transversely through the rear ends of the side walls 11 and 12 I provide a slot or eyelet 19 which extends longitudinally along the length of the tool. The back wall 20 (Figure 1) of this eyelet extends substantially at right angles to the side walls 11 and 12 of the tool, and at right angles to the major axis of the tool itself. On the other hand, for reasons which will be developed, the front wall (looking in the direction of the tip 16) is disposed at an acute angle to the side walls 11 and 12, and similarly at an acute angle to the major axis of the tool itself. In this manner the eyelet 19 is provided with a comparatively short back opening 21, as shown in Figure 2, and an elongated front opening 22 shown in Figure 1 and comprised of the completely through eyelet portion 19 and the angularly disposed extent, or front wall 23, extending forwardly.

As is evident from a consideration of Figures 1 through 8, inclusive, grooves 24, 25 extend along surface 12 and 11, respectively, from the rear wall 20 of the eyelet 19 to the back end 15 of the tool. For a purpose which will likewise be developed hereinafter, the vertical, marginal intercept 29 of the left side wall 12 with the end wall 15 of the tool 10 is rounded so that the two surfaces merge smoothly into each other, without appreciable interruption. The manner in which this protects the yoke of the hook will be developed shortly.

It will now be in order to develop the exact mode of utilization of this tool in the removal of hooks imbedded in the mouth or throat of a fish. In each instance, the ultimate objective is to mask the barb 27 (Figure 6) of the hook in one of the grooves 24, 25 in the side walls 11, 12 of the tool and to protect yoke 28 of the hook by the rounded junction 29 of the marginal intercept between side wall 12 and end wall 15, and to support the shank 30 of the hook in such manner in the eyelet 19 that the foregoing objectives are effectively achieved.

We will first assume that the hook is imbedded in the fish's mouth. In such instance the technique embracing the feature of Figure 6 is employed. That is, the fish line 31 is looped as at 32 and inserted through the back opening 21 of the eyelet 19 so that the shank 30 of the fish hook rests against the sloping part 23 of the eyelet. In other words, this sloping part 23 of the eyelet faces towards the back of the shank 30 of the hook. The yoke 28 then assumes a curve about the rounded marginal intercept 29, and the barb 27 adapts itself to the grooves 24.

In use, the loop 32 is first formed and inserted in the tool 10. The operator grasps this loop and secures a good purchase thereon, securing it firmly against the forward part of picker 10, and then slides the rear part of the tool, held sidewise with the right surface 12 uppermost, down into and against the yoke 28 of the hook, where the same is imbedded in the mouth of the fish. This forces groove 24 against the barb 27, effectively masking the latter, and substantially nullifying its effectiveness as an anchor. A firm downward pressure insures this protective engagement. A slight turn of the tool, while the hook is held in its protected, reinforced, and masked position, and while the downward pressure is maintained, results in release of the hook from the mouth of the fish. Thereupon, upon further slight downward motion, the hook is entirely freed and can be readily raised, while the barb thereof remains in masked position against groove 24, until it is entirely clear of the fish. In this manner no mutilation of the head of the fish occurs, there is no danger of the operator being injured, and at the same time the hook is effectively reinforced and protected against damage throughout the entire removing operation. It is instantly ready for repeated use. The fish, if too small, unedible, or for any other reason is not desired, may be cast back in the water without hesitancy since it has been substantially undamaged.

Should, however, the hook be imbedded deeper in the fish, as for example, in the throat, then the technique is employed as illustrated in Figure 7. Therein the tool 10 is positioned substantially as shown in Figure 2, turned on its side but this time with face 11 disposed uppermost. The small side 21 of the eyelet 19 is disposed towards the back of the shank 30 of the hook. The yoke or bale 28 thereof is snugly received around the curve marginal intercept 29 of the side wall 12 and the end wall 15, adapting to the contour thereof, while the barb 27 is snugly received in the groove 25. At all times, then, the barb 27 is masked and the yoke 28 and shank 30 of the hook are reinforced and protected.

In the event an attempt was made to release the hook from the mouth of the fish with the tool in the position shown in Figure 7, however, in which instance the hook is inclined at but a slight angle to the horizontal, then the working end of the tool would not properly mask the barb. Not only would tearing occur upon attempt to remove the barb, but as well, damage to the hook might quite likely result. On the other hand, if an attempt was made to withdraw the hook from the throat of the fish, in which instance the hook would make but a slight angle with the vertical, then with the tool in the position shown in Figure 6, the barb 27 would not be masked, and the yoke or bale 28 would not be protected.

When the technique is employed as has been set forth hereinbefore, however, the desirable result is achieved that at all times during the use of my new tool the barb is completely masked and its anchoring effect overcome and entire protection is given both to the yoke 28 and to the shaft 30. A simple downward thrust, accompanied by a slight twisting motion, easily releases the hook. Thereupon, with the loop 32 held tightly against the tool 10, the latter can be readily and quickly removed from the throat of the fish, together with the masked and protected hook.

It is thus apparent from the foregoing that the several objectives of my invention have all been satisfactorily achieved. The fish can be released from entrapment and enmeshment in the strands of the net without injury thereto and without damage to the net. Similarly, the hook can be removed from any portion of the fish without injury thereto or to the operator, and without damage to the hook. The instrument itself is simple both in design and manufacture, is sturdy and reliable in use, possesses long life, and is of low first cost. It can easily be acquired, therefore, and become an essential part of every fisherman's kit, be he either professional or amateur in that field.

Since many embodiments can be made of my invention once the broad aspects thereof are disclosed, I intend that the foregoing disclosure should be taken as purely illustrative, and not by way of limitation.

I claim:

1. As a new article of manufacture, a fish-handling picker, comprising an elongated shaft tapering forwardly and gradually downwardly and inwardly, and side walls converging towards a relatively straight bottom to form a blunted point, the said straight bottom having a shallow longitudinal groove near the front, blunted end thereof.

2. As a new article of manufacture, a tool of light-weight, corrosion-resistant material, useful in the handling of fish, comprising an elongated shaft with side walls tapering forwardly and gradually downwardly and inwardly towards a relatively straight bottom having a shallow longitudinal groove near the front, blunted end thereof.

3. As a new article of manufacture, a fish-handling picker of plastic material, comprising an elongated shaft with side walls tapering forwardly and gradually downwardly and inwardly towards a relatively straight bottom to form a blunted point, the said straight bottom having a shallow longitudinal groove near the front, blunted end thereof.

4. A picker for the removing of hooks from fish, comprising an elongated shaft, an eyelet extending transversely through said shaft near the rear end thereof, the rear short wall of which, closely adjacent the rear end of the shaft, is substantially at right angles to the side surface of the shaft, and the front wall of which, remote from the rear end of the shaft, extends at an acute angle from the surface of the shaft, said eyelet being substantially longer on one face of the shaft than on the opposite face thereof.

5. A picker for removing hooks from fish, formed of light-weight, corrosion-resistant material, comprising an elongated body portion, a longitudinal eyelet extending transversely through said body near the rear end thereof, the rear short wall of which eyelet, closely adjacent the rear end of the body, is substantially at right angles to the side surface of the latter, and the front wall of which eyelet, remote from the rear end of the body, extends at an acute angle from the side surface of the body, the eyelet being substantially longer on one side face of the body than on the opposite side thereof, and a groove extending along the side surface of the body from the rear end of the short wall to the rear end of the body.

6. A picker for removing hooks from fish, formed of light-weight, corrosion-resistant material, comprising an elongated body portion, a longitudinal eyelet extending transversely through said body near the rear end thereof, the rear wall of which, closely adjacent the rear end of the body, is substantially at right angles to the side surface thereof, and the front wall of which eyelet, remote from the rear end of the body, extends at an acute angle from the side surface of the body, the eyelet being substantially longer on one side face of the body than on the opposite face thereof, and longitudinal grooves, one in each side face of the body, extending rearwardly from the rear wall of the eyelet to the rear end of the wall.

7. A tool for removing hooks from fish, of light-weight, corrosion-resistant material, comprising an elongated body portion with side walls tapering toward a blunted point, a longitudinal eyelet extending transversely through said body near the rear end thereof, the rear, short wall of which, closely adjacent the rear end of the body, is substantially at right angles to the side surface thereof, and the front wall of which eyelet, remote from the rear end of the body, extends at an acute angle from the side surface thereof, thereby providing an opening which is substantially longer on one side face of the body than on the opposite side thereof, the rear of that side wall of the tool on which the longer extent of the longitudinal eyelet opens being rounded at its marginal intercept with the rear end of the body, and a groove extending along the face of the body from the rear end of the short wall to the rear end of the tool.

WILLIAM E. KETLAND.

REFERENCES CITED

The following references are of record in the file of this patent:

UNITED STATES PATENTS

| Number | Name | Date |
|---|---|---|
| 1,000,775 | Buas | Aug. 15, 1911 |
| 1,629,583 | Nelson | May 24, 1927 |
| 2,050,194 | Pflueger | Aug. 4, 1936 |